United States Patent [19]

Katzfey

[11] 4,305,092

[45] Dec. 8, 1981

[54] VIDEO PROJECTION APPARATUS

[75] Inventor: Lance J. Katzfey, San Diego, Calif.

[73] Assignee: Sony Corporation, Tokyo, Japan

[21] Appl. No.: 116,400

[22] Filed: Jan. 29, 1980

[51] Int. Cl.$^3$ .................................................. H04N 9/31
[52] U.S. Cl. ........................................................ 358/60
[58] Field of Search .................... 358/56, 60, 63, 62, 358/64, 66, 10

[56] References Cited

U.S. PATENT DOCUMENTS

| | | |
|---|---|---|
| 2,518,199 | 8/1950 | Sziklai . |
| 2,560,168 | 7/1951 | Goldsmith . |
| 2,586,558 | 2/1952 | Oakhill . |
| 2,724,737 | 11/1955 | Hogan . |
| 2,830,111 | 4/1958 | Farnsworth ............... 358/64 X |
| 2,885,464 | 5/1959 | Loughlin . |
| 2,949,055 | 8/1960 | Blackstone ............... 358/88 |
| 2,989,584 | 6/1961 | Mengle . |
| 3,115,544 | 12/1963 | Marley . |
| 3,473,872 | 10/1969 | Okamura . |
| 3,485,944 | 12/1969 | Stephens, Jr. |
| 3,943,279 | 3/1976 | Austefjord . |
| 3,967,315 | 6/1976 | Goodman . |
| 3,969,648 | 7/1976 | Hergenrother et al. |
| 4,004,093 | 1/1977 | Oland . |
| 4,024,579 | 5/1977 | Hergenrother et al. |
| 4,032,968 | 6/1977 | Miyoshi et al. |
| 4,051,513 | 9/1977 | Takeuchi et al. |
| 4,087,835 | 5/1978 | Nishimura et al. |

*Primary Examiner*—Robert L. Richardson
*Attorney, Agent, or Firm*—Lewis H. Eslinger; Alvin Sinderbrand

[57] ABSTRACT

A video projecting apparatus for projecting a compound image onto a projection screen includes a single cathode ray tube having a face plate with red, green and blue color phosphor screens sequentially arranged thereon, for example, in the horizontal line scanning direction, and an electron gun for generating an electron beam to sequentially scan the color phosphor screens as the beam is modulated by respective red, green and blue color components of a video signal; a source of a video signal; a memory device for simultaneously storing at least the red, green and blue color components of the video signal at a first rate during each horizontal line scan period; and a transmitting device for sequentially transmitting from the memory device, at a second, faster rate during the next horizontal line scan period, the red, green and blue color components earlier stored in the memory device for modulating the electron beam in the cathode ray tube as the beam sequentially scans the respective color phosphor screens, and in which the red, green and blue color components are sequentially transmitted within the time required to store each color component in the memory device.

39 Claims, 23 Drawing Figures

FIG.6A  MEMORY 10a

FIG.6B  MEMORY 10b

FIG.6C  MEMORY 10c

FIG.6D  MEMORY 10d

FIG.6E  MEMORY 10e

FIG.6F  MEMORY 10f

FIG.6G  SWITCH 24a

FIG.6H  SWITCH 24b

FIG.6I  SWITCH 24c

FIG.6J  OUTPUT

FIG. 7A  MEMORY 44a

FIG. 7B  MEMORY 44b

FIG. 7C  SWITCH 50

FIG. 7D  OUTPUT 52R

FIG. 7E  OUTPUT 52G

FIG. 7F  OUTPUT 52B

FIG. 7G  OUTPUT

FIG. 8

VIDEO PROJECTION APPARATUS

BACKGROUND OF THE INVENTION

1. Field of the Invention

This invention relates generally to an apparatus for producing a video signal and, more particularly, is directed to a video projecting apparatus for projecting a compound color image onto a projection screen.

2. Description of the Prior Art

Color television systems of the projection type are well-known in the art. Typically, in such systems, three primary color images, that is, red, green and blue images, are separately projected by three cathode ray tubes and combined on a projection screen to produce a compound color image. More particularly, in such systems, the red, green and blue color components of a received video signal are each applied to a respective cathode ray tube for modulating the respective electron beam as the beam scans the color phosphor screen of that tube. The resultant single color images formed on the color phosphor screens are then superimposed on a projection screen by a plurality of lenses to form a compound color image. However, such a system has proven to be undesirable for various reasons. For example, the utilization of three separate cathode ray tubes results in a video projection system of a relatively large size. Due to this relatively large size, and due to the use of three cathode ray tubes, the system has proven to be very costly. In addition, the power requirements in this system are large because of the utilization of three electron guns.

Other types of television systems have attempted to remedy the disadvantages of the above video projection system. For example, commonly employed television receivers, not of the projection type, typically include a single cathode ray tube with three electron guns. Such receivers, in order to obtain accurate color registration of the produced image, utilize repetitive red, green and blue color phosphor stripes or triads of phosphor dots along the front face of the cathode ray tube. Consequently, to obtain synchronization of the electron beams from the three guns with the respective color phosphor stripes or dots, a complex synchronization system must be used. Further, in order to block stray electrons from impinging on the wrong color phosphor dots or stripes, the tube must utilize a shadow mask or aperture grill, resulting in additional cost and complexity. Again, as with the three tube-three gun projection systems, the power requirements in this system are large.

Although single cathode ray tube-single electron beam systems have been devised, such systems have also proven to be undesirable for various reasons. For example, one such system is a beam-index color television receiver in which complex synchronization circuitry must be utilized to synchronize the color signals which modulate the single electron beam as it scans the repetitive color phosphor stripes. To accomplish this, repetitive index stripes are provided on the face of the cathode ray tube in predetermined positional relationships to the color phosphor stripes and emit light or radiant energy as they are scanned by the electron beam. A photo-detector is operative to detect light emitted from the index stripes and to produce a periodic index signal. This index signal is then used to produce a gating signal to sequentially gate the respective color components of the video signal to the cathode ray tube to modulate the electron beam as it scans the respective color phosphor stripes.

Although other single cathode ray tube-single electron beam systems have been proposed, these systems have also been of a relatively complex nature. Thus, for example, in U.S. Pat. No. 2,518,199, a single cathode ray tube-electron beam system is provided in which the electron beam scans vertically arranged sequential color posphor screens in a zig-zag manner. However, because of the non-conventional scan utilized in this system, a non-standard NTSC signal must be provided at the video signal transmitter in order for the television receiver to operate properly. Another single cathode ray tube-single electron beam apparatus is shown in U.S. Pat. No. 3,473,872 in which the cathode ray tube has green, red and blue color filters sequentially arranged on the front face of the cathode ray tube in the horizontal line scanning direction. In this system, however, the horizontal scanning frequency is reduced to one-third of its usual value so that only one color component is separated from the video signal during each horizontal line scan. That is, each horizontal line scan produces only one color image. Although such a system is adequate for slow moving or still-motion pictures, the system does not satisfactorily operate with fast-motion pictures because of the flicker effect. This is due to the fact that a conmplete picture is produced only during each one-tenth of a second, rather than during the conventional one-thirtieth of a second. In addition, this apparatus provides a complex fiber-optic network for reproducing the compound color image from the three color phosphor screens of the cathode ray tube.

OBJECTS AND SUMMARY OF THE INVENTION

Accordingly, it is an object of this invention to provide an improved apparatus for producing a video signal that is particularly applicable to video projecting apparatus and that avoids the above-described difficulties encountered with the prior art.

More particularly, it is an object of this invention to provide a video projecting apparatus employing a single cathode ray tube with single electron beam and which utilizes standard NTSC signals.

Another object of this invention is to provide a video projecting apparatus in which the color components of the video signal are simultaneously stored within a memory device during each horizontal line scan period and are sequentially transmitted from the memory device to the cathode ray tube during the next horizontal line scan period.

In accordance with an aspect of this invention, apparatus for producing a video signal having at least two color components includes a source of the video signal, means for simultaneously storing the at least two color components at a first rate, and means for sequentially reading out the at least two color components from the storing means at a second, faster rate, in which the at least two color components are sequentially read out in a time not greater than the time within which each of the at least two color components is simultaneously stored.

According to a feature of this invention, the apparatus for producing a video signal is utilized in a video projecting apparatus which is adapted to project a compound image onto a projection screen and includes a cathode ray tube having a face plate with a plurality of color phosphor screens sequentially arranged thereon, preferably in the horizontal line scanning direction, and an electron gun for generating an electron beam to sequentially scan the color phosphor screens as the beam is modulated by the respective color components of the video signal.

The above, and other, objects, features, and advantages of the invention, will be apparent in the following detailed description of illustrative embodiments of the invention which is to be read in connection with the accompanying drawings.

DETAILED DESCRIPTION OF THE PREFERRED EMBODIMENTS

Figure 1:
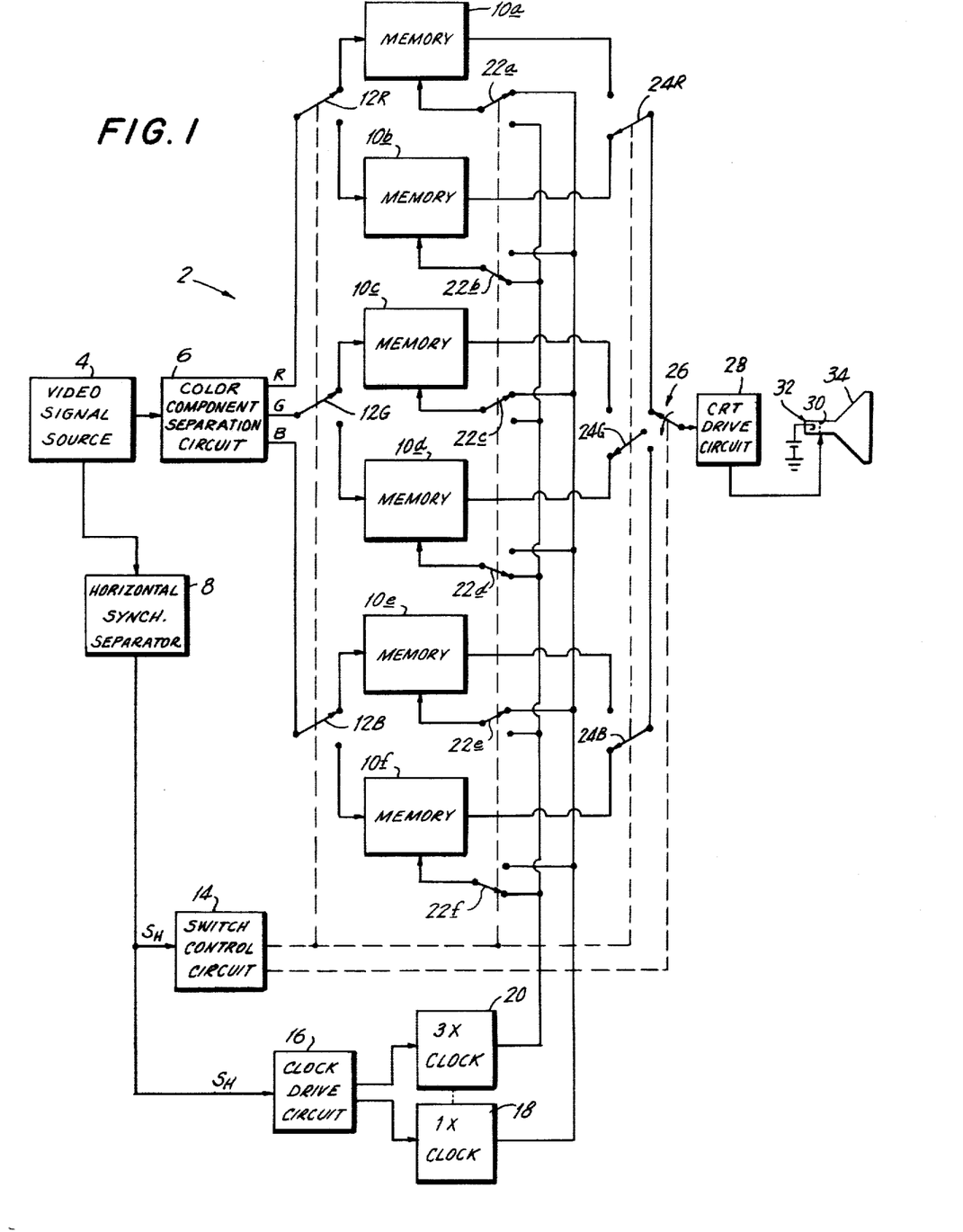
FIG. 1 is a block diagram of a first embodiment of an apparatus for producing a video signal according to this invention.

Referring to the drawings in detail, and initially to FIG. 1 thereof, it will be seen that, in a video projecting apparatus 2 according to this invention, a video signal, including chrominance and luminance components and horizontal and vertical synchronizing signals, is supplied from a video signal source 4 to a conventional color component separation circuit 6 which separates the red (R), green (G) and blue (B) color component signals from the video signal. The video signal is also supplied to a horizontal synchronizing signal separator 8 for deriving the horizontal synchronizing signals $S_H$ therefrom. The red (R), green (G) and blue (B) color components are supplied, through singlepole double-throw input switches 12R, 12G, and 12B, to analog memory devices 10a-10f, which may be, for example, charge-coupled devices (CCD), such as the dual 455-bit analog shift register CCD 321 sold by Fairchild Camera and Instrument Corp., which shifts the information into and from the register at a rate determined by an external clock. As shown by the dashed lines of FIG. 1, switches 12R, 12G and 12B are ganged so that the red (R), green (G) and blue (B) color components of the video signal are simultaneously read into memory devices 10a, 10c and 10e, respectively, or into memory devices 10b, 10d and 10f, respectively. To ensure such action, switches 12R, 12G and 12B are controlled by a switch control circuit 14 to change over between the input terminals of the respective pairs of memory devices 10a, 10b; 10c, 10d; and 10e, 10f. It is to be realized, of course, that although switches 12R, 12G and 12B are shown as singlepole double-throw switches, these switches are preferably constituted by conventional semiconductor gating circuits. Preferably, such switching action occurs after every horizontal line period so that during every other horizontal line period, information is read into memory devices 10a, 10c and 10e and, during the remaining horizontal line periods, information is read into memory devices 10b, 10d and 10f. In this manner, horizontal synchronizing signals $S_H$ from horizontal synchronizing separator 8 are supplied to switch control circuit 14 for controlling the operation thereof. Thus, referring to the first pair of memory devices 10a and 10b, one horizontal line of red color component information is read into memory device 10a during a first horizontal line scan period, the next horizontal line of red color component information is read into memory device 10b during the second horizontal line scan period, the next horizontal line of red color component information is read into memory device 10a during the third horizontal line scan period, and so on. Memory devices 10c-10f store the green and blue color component information, respectively, in the same manner.

The rate at which each line of video information is read into and out of the memory devices is determined by an external clock system. Thus, horizontal synchronizing signal separator 8 also supplies horizontal synchronizing signals $S_H$ to a clock drive circuit 16 for driving external clocks 18 and 20 which supply respective clock signals to memory devices 10a-10f through single-pole double-throw switches 22a-22f, respectively. It is, of course, to be realized that these switches also are preferably of the semiconductor gating type, and are also ganged to each other and to switches 12R, 12G and 12B, as shown by the dashed lines in FIG. 1. Thus, at the end of each horizontal line scan period, switches 22a-22f change over between clock 18 and clock 20. For example, when switch 22a is connected to clock 18, switch 12R is connected to memory device 10a so that the rate at which the red color component of the video signal is read into memory device 10a is always determined by clock 18. At the same time, switch 22b is connected to clock 20. However, during the next horizontal line scan period, switches 22a and 22b change over to clocks 20 and 18, respectively, while input switch 12R is connected to memory device 10b. Because of this arrangement, clock 20 is never connected to memory devices 10a-10f when these memory devices are supplied with the respective color components of the video signal from color component separation circuit 6, as will be understood by the ensuing description.

Memory devices 10a-10f further have their outputs connected to single-pole double-throw output switches 24R, 24G and 24B, respectively, which are also preferably constituted by semiconductor gating devices. As shown by the dashed lines in FIG. 1, switches 24R, 24G and 24B are also ganged together and to switches 12R, 12G and 12B and 22a-22f so that when input switches 12R, 12G and 12B are connected to memory devices 10a, 10c and 10e, respectively, output switches 24R, 24G and 24B are connected to memory devices 10b, 10d and 10f. Conversely, when input switches 12R, 12G and 12B are connected to memory devices 10b, 10d and 10f, output switches 24R, 24G and 24B are connected to memory devices 10a, 10c and 10e. Thus, it is readily seen that memory devices 10a-10f are only supplied with pulses from clock 20 when connected to output switches 24R, 24G and 24B and clock 18 never supplies clock pulses to any of memory devices 10a–10f during a time when such memory device is connected to the respective input switch 12R, 12G or 12B.

Preferably, clock 20 is designed to produce clock pulses having a frequency three times that of the pulses produced by clock 18. Thus, for example, if clock 18 produces pulses having a frequency of 7.16 MHz, clock 20 produces clock pulses having a frequency of 21.48 MHz. Of course, it is to be realized that the clock pulses from clock 20 may be derived from the clock pulses from clock 18, by, for example, a phase-locked loop. Since clock 20 only supplies clock pulses to a memory device during the read-out operation and clock 18 only supplies clock pulses to a memory device during the storing or write-in operation, the video information which had previously been stored in any one of memory devices 10a–10f is read out during the respective next successive horizontal line scan period at three times the rate at which it was stored therein. For example, if one horizontal line of video information is read into memory device 10a during a first horizontal line scan period, the same information is read out from device 10a in compressed form during the first third of the next horizontal line scan period. In order to provide a continuous read-out from the memory devices, the outputs of memory devices 10a–10f are fed back to the respective inputs thereof during the reading out operation so that three identical compressed signals are sequentially read out from the memory devices during each horizontal line scan period, as shown in FIGS. 6A–6F. Thus, during the read-out process, the signals stored in the memory devices are cyclically regenerated through the respective memory devices so that the same signal that was previously read into the respective memory device is read out from that memory device three times in succession and within the same time period within which the original signal was read into that memory device. Of course, such cyclic regeneration is halted when new data is read into a memory device from color component separation circuit 6.

Figure 6A:
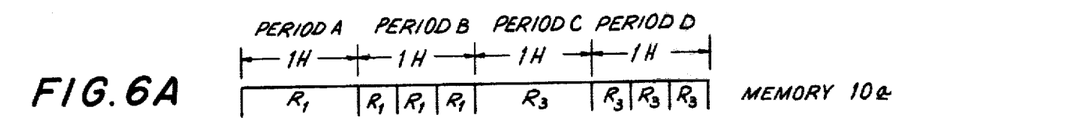
FIGS. 6A-6J are diagrams used for explaining the operation of the embodiments of FIGS. 1, 3 and 4.
Figure 6B:
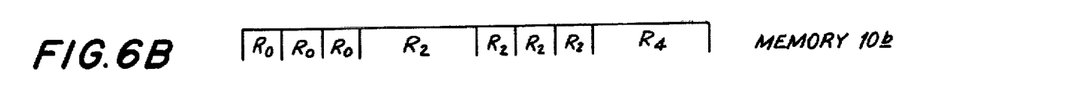
Figure 6C:
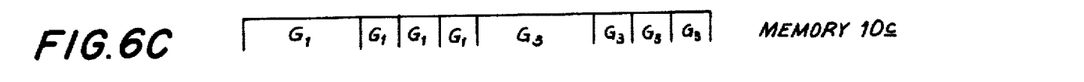
Figure 6D:
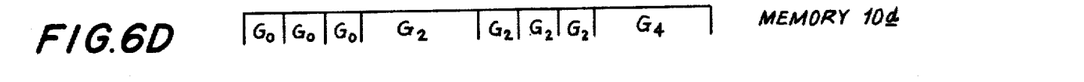
Figure 6E:
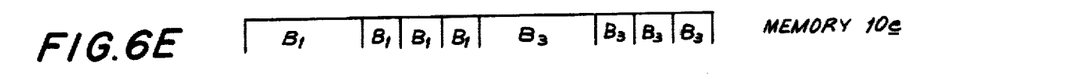
Figure 6F:
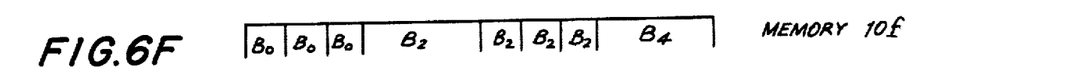
Figure 6G:
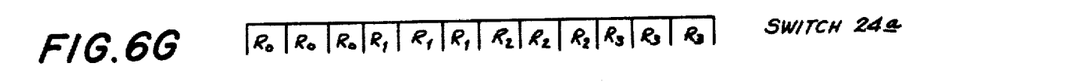
Figure 6H:
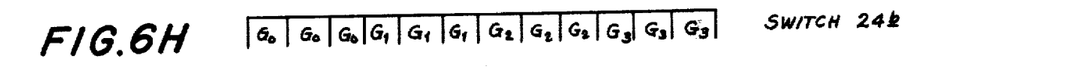
Figure 6I:
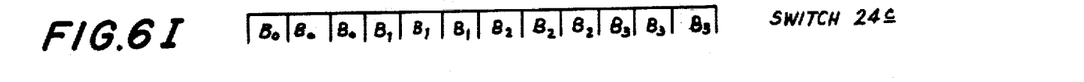

Thus, in operation, and referring first to memory devices 10a and 10b while assuming that switch 12R originally contacts the input terminal of memory device 10a and output switch 24R originally contacts the output terminal of memory device 10b, it will be appreciated that, since memory device 10a is now connected to color component separation circuit 6, clock pulses from clock 18 are supplied to memory device 10a through switch 22a so that one horizontal line of red color component information is stored in memory device 10a at the normal or 1× rate, that is, one horizontal line of red color component information is stored in memory device 10a during one horizontal line scan period. However, at the same time, clock pulses from clock 20 are supplied through switch 22b to memory device 10b so that the horizontal line of red color component information previously stored in memory device 10b is read out from that memory device at three times (3×) the rate that it was previously stored or written in the memory device. Since, during this time, the information within memory device 10b is cyclically regenerated, the red color component is read out of memory device 10b three times in succession during one horizontal line scan period. For example, as shown in FIGS. 6A and 6B, while the red color component $R_1$ is written in memory device 10a during the horizontal line scan period, memory device 10b reads out the previously stored red color component $R_O$ three times in succession during the same horizontal line scan period. Then, during the next horizontal line scan period, all of the switches are reversed so that memory device 10a now reads out the previously stored red color component $R_1$ three times in succession and memory device 10b has written therein a new red color component $R_2$, during the same horizontal line scan period, and so on. Memory devices 10c, 10d and 10e, 10f operate in an identical manner in regard to the green and blue color components, respectively, as shown in FIGS. 6C–6F. The only signals supplied to switch 24R appear in succession as follows: three compressed color component signals $R_O$ from memory device 10b, three compressed color component signals R1 from memory device 10a, three compressed color component signals R2 from memory device 10b, and so on, as shown in FIG. 6G. In like manner, the outputs produced at switches 24G and 24B, in regard to the green and blue color component signals, appear in identical form as shown in FIGS. 6H and 6I.

Figure 6J:
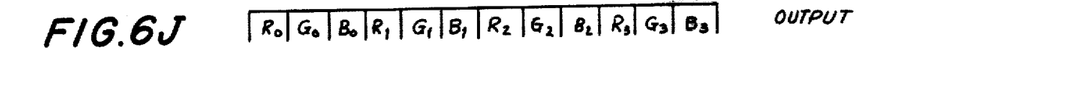

The signals from switches 24R, 24G and 24B are then supplied to an output switch 26 which is designed to cyclically connect the outputs from switches 24R, 24G and 24B to a CRT drive circuit 28 during each horizontal line scan period. In this regard, switch 26 is controlled by switch control circuit 14 which has the horizontal synchronizing signals $S_H$ supplied thereto. Preferably, each of the compressed color component signals is supplied to CRT drive circuit 28 during a respective third of each horizontal line scan. To accomplish this, switch 26 is connected to the output of switch 24R during the first third of each horizontal line scan period to supply the red color component during this time. In like manner, switch 26 is connected to the output of switch 24G during the second third of each horizontal line scan period and to the output of switch 24B during the last third of each horizontal line scan period. Thus, during each horizontal line scan period, an RGB sequence of signals is received at CRT drive circuit 28, as shown in FIG. 6J. As shown therein, during the first horizontal line scan period A, signals $R_0$, $G_0$, $B_0$ are generated at switch 26, during the next horizontal line scan period B, signals $R_1$, $G_1$, $B_1$ are generated at switch 26, and so on. Of course, it is to be realized that switch 26 preferably is also of the semiconductor gate type. It is also to be realized that switch 26 may be incorporated into clock drive circuit 16 to control the supply of clock pulses from clock 20 to the respective memory devices 10a–10f during the respective thirds of each horizontal line scan period. In such a case, pulses from clock 20 would only be supplied to the appropriate one of memory devices 10a and 10b during the first third of each horizontal line scan period, and to the appropriate one of memory devices 10c, 10d and 10e, 10f during the second and last thirds of each horizontal line scan period, respectively. It is to be noted that, in this latter case, no cyclic regeneration of the video information stored in the memory devices is required.

Returning to FIG. 1, it will be seen that CRT drive circuit 28 then supplies a compensated color component signal to a control grid 30 of an electron gun 32 of a cathode ray tube 34 so as to modulate the electron beam with color component information as it scans the front face of cathode ray tube 34. It is, of course, to be realized that CRT drive circuit 28 compensates the sequential color component signal shown in FIG. 6J to provide suitable horizontal and vertical retrace periods, and further provides suitable horizontal and vertical synchronizing signals in the sequential color component signal.

Figure 8:
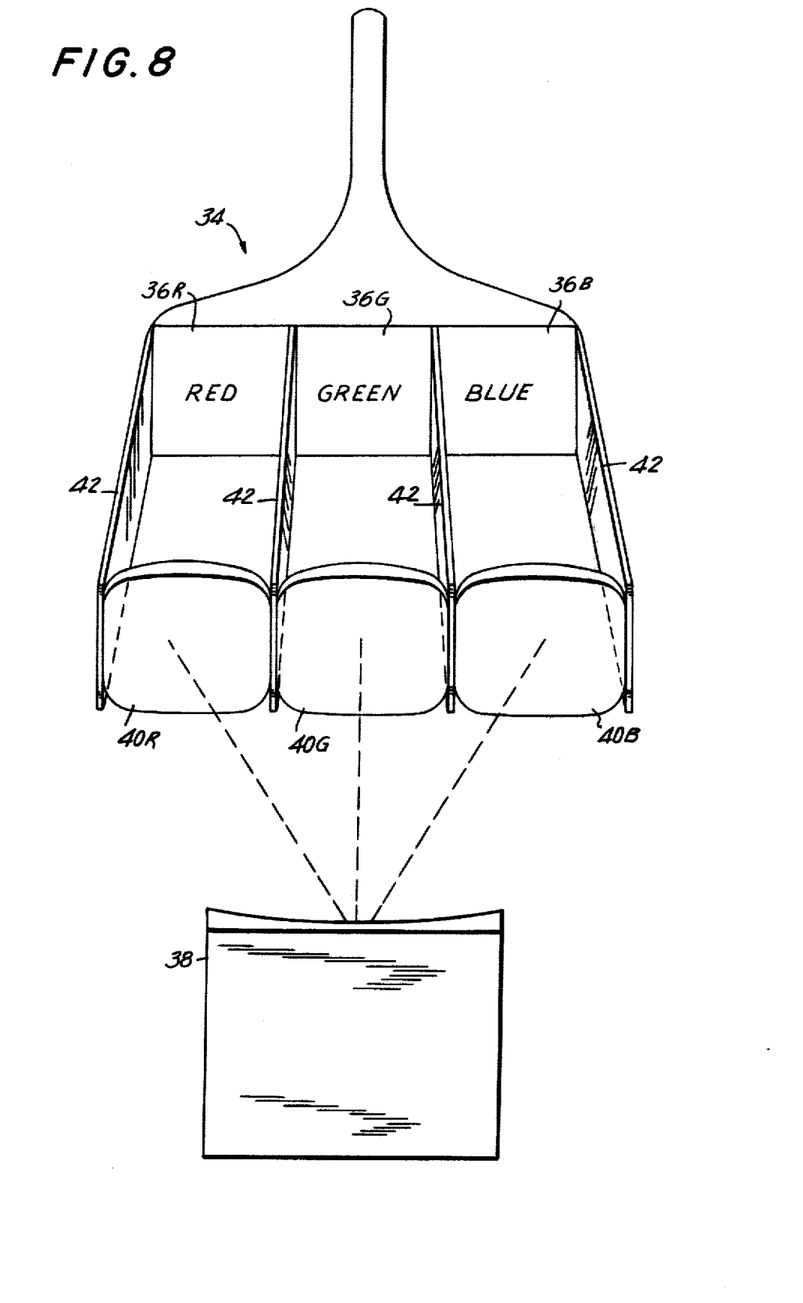
FIG. 8 is a schematic diagram of a cathode ray tube and respective projecting lenses, which can be utilized for projecting a compound image corresponding to a video signal produced by any one of the embodiments of FIGS. 1-5.

Referring now to FIG. 8, there is shown one embodiment of a cathode ray tube 34 which can be utilized with the present invention. As shown therein, cathode ray tube 34 is provided with three color phosphor screens arranged side-by-side on the front face thereof. More particularly, red, green and blue phosphor screens 36R, 36G and 36B of identical dimensions are sequentially arranged in the horizontal line scanning direction on the front face of the cathode ray tube. Therefore, during the first third of each horizontal line scan, the electron beam impinges on red phosphor screen 36R, during the second third of each horizontal line scan the electron beam impinges on green phosphor screen 36G, and during the last third of each horizontal line scan the electron beam impinges on blue phosphor screen 36B. In this regard, it should be remembered that during the first third of each horizontal line scan the electron beam is modulated with the red color component of the video signal, during the next third with the green color component and during the last third with the blue color component.

The red, green and blue phosphor screens 36R, 36G and 36B preferably each have appropriate dimensions to produce a non-distorted image thereon. For example, as shown in FIG. 8, the resultant combined face plate of cathode ray tube 34 may have a large horizontal line scan dimension and a relatively small dimension in the vertical direction. The images formed on red, green and blue phosphor screens 36R, 36G and 36B are superimposed on a projection screen 38 by respective lenses 40R, 40G and 40B to form a compound color image thereon. Light shields 42 are preferably provided to separate the optical paths between the red, green and blue color phosphor screens and their respective lenses, thereby to avoid any interference between the respective images formed on the phosphor screens.

Figure 2:
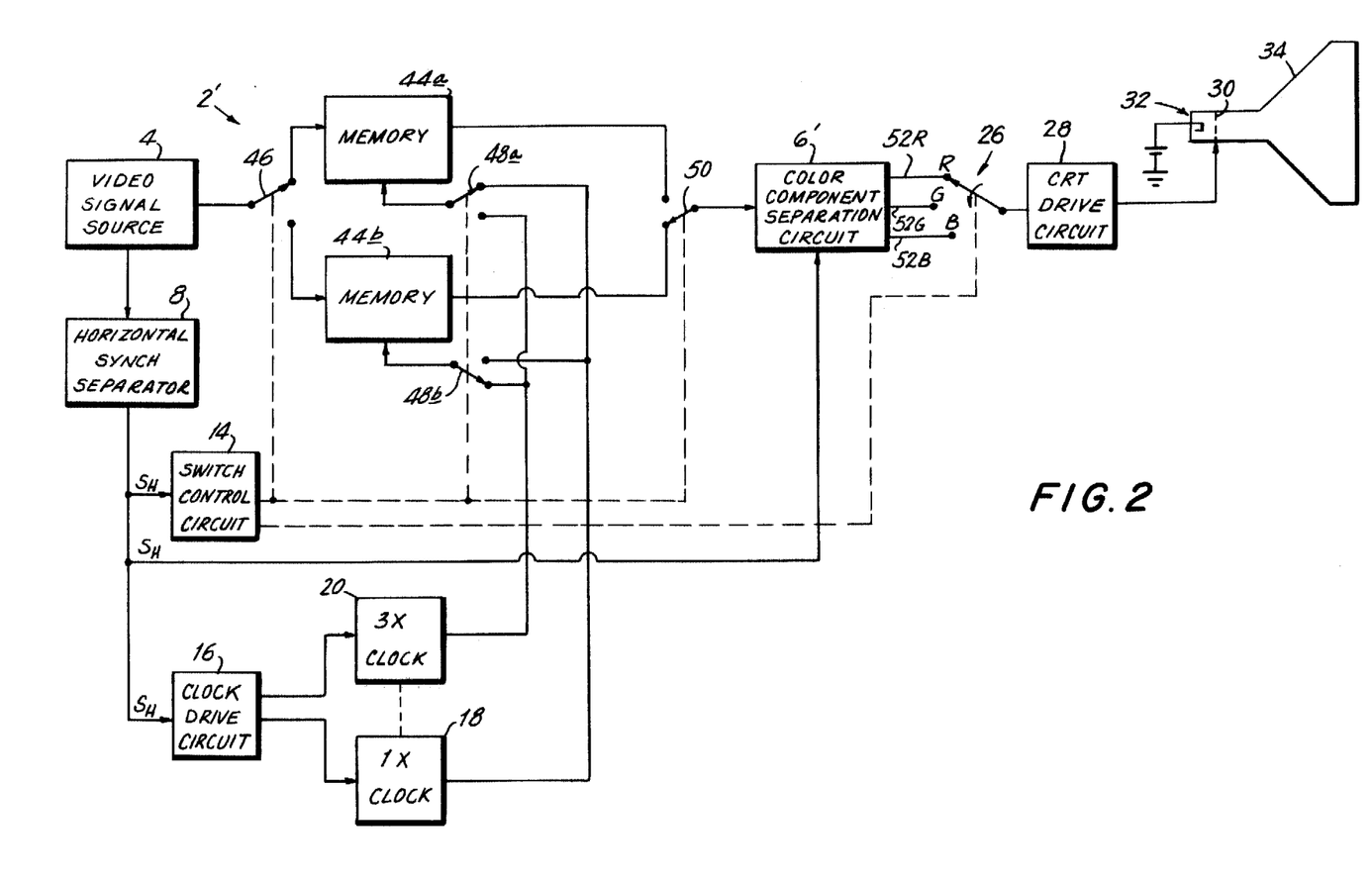
FIG. 2 is a block diagram of another embodiment of an apparatus for producing a video signal according to this invention.

Referring now to FIG. 2, it will be seen that, in a video projecting apparatus 2' according to another embodiment of the invention, elements corresponding to those described above with reference to the apparatus of FIG. 1 are identified by the same reference numerals. In the apparatus 2' of FIG. 2, the original video signal from video signal source 4, including chrominance and luminance components and horizontal synchronizing signals, prior to being separated into the red, green and blue color components, is alternately supplied to two analog memory devices 44a and 44b through a double-pole single-throw switch 46, which is preferably constituted by a semiconductor gating device. After each horizontal line scan period, switch 46 changes over to alternately contact the input terminal of memory device 44a or 44b and is controlled by switch control circuit 14 which is supplied with horizontal synchronizing signals $S_H$ from horizontal synchronizing signal separator 8. Memory devices 44a and 44b are supplied with clock pulses from external clocks 18 and 20 through double-pole single-throw clock switches 48a and 48b, respectively, which are also preferably of the semiconductor gating type, and which are ganged with input switch 46. Clocks 18 and 20 are driven by clock drive circuit 16 which is responsive to the horizontal synchronizing signals $S_H$ from horizontal sychronizing signal separator 8. Thus, when memory device 44a or 44b is storing or writing the video signal during a horizontal line scan period, that memory device is supplied with clock pulses from clock 18. On the other hand, when a memory device is reading out the video signal previously stored therein, that memory device is supplied with clock pulses from clock 20 at a frequency three times that of the pulses from clock 18 to read out the video information three times in succession during a horizontal line scan period. Each of the memory devices 44a and 44b is further connected to a respective contact of a double-pole signal-throw output switch 50 which alternately switches between the outputs of memory devices 44a and 44b in opposition to input switch 46. In other words, when input switch 46 contacts memory device 44a (44b), output switch 50 contacts the other memory device 44b (44a). Again, during each readout operation, the information stored in the memory devices is cyclically regenerated through the respective memory device. As in the embodiment of FIG. 1, all of the switches 46, 48a, 48b and 50 are preferably of the semiconductor gating type and are ganged to change over at each horizontal line scan period.

Figure 7A:
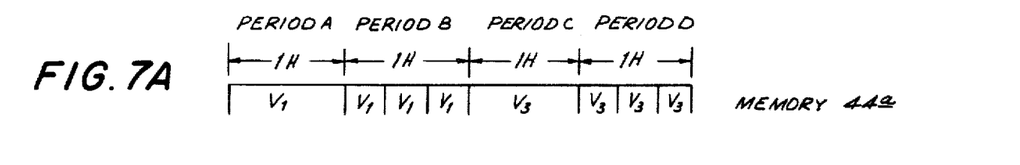
FIGS. 7A-7G are diagrams used for explaining the operation of the embodiments of FIGS. 2 and 5.
Figure 7B:
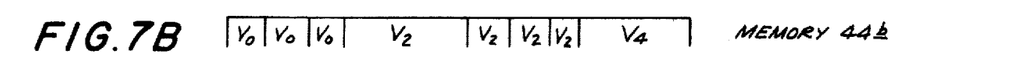
Figure 7C:
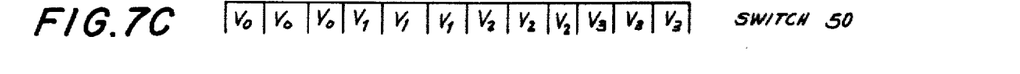
Figure 7D:
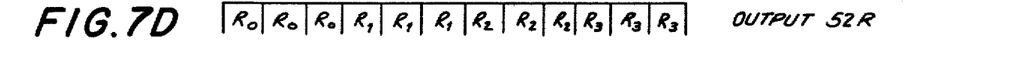
Figure 7E:
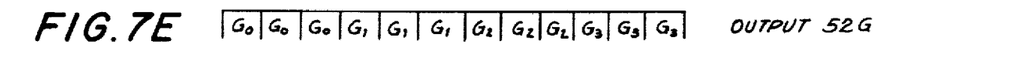
Figure 7F:
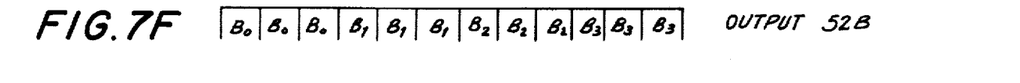
Figure 7G:
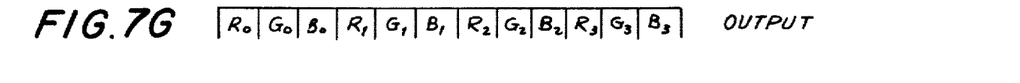

Thus, as shown in FIG. 7C, during the first horizontal line scan period A, three sequentially compressed video signals $V_0$ are produced at switch 50, during the next horizontal line scan period B, three sequentially compressed video signals $V_1$ are produced, and so on. Switch 50 supplies these compressed sequential video signals to a color component separation circuit 6', which has supplied thereto the horizontal synchronizing signals $S_H$ from horizontal sychronizing signal separator 8, and which functions to separate the received video signals into respective red (R), green (G) and blue (B) color components. Thus, for example, during the first horizontal line scan period A, color component separation circuit 6' derives the red color component (R) from each of the three sequential vido signals $V_0$ and produces three sequential red color components $R_0$ therefrom at its red output terminal 52R, as shown in FIG. 7D. In like manner, during the same horizontal line scan period A, three sequential green color component signals $G_0$ are derived from the sequential video signals $V_0$ and supplied to green output terminal 52G, as shown in FIG. 7E. Also, three sequental blue color component signals $B_0$ are produced at blue output terminal 52B, as shown in FIG. 7F. Output terminals 52R, 52G and 52B are then cyclically contacted by three-pole singlethrow output switch 26 during each horizontal line scan period in a manner identical to switch 26 of FIG. 1. Thus, switch 26 supplies a sequential RGB signal to CRT drive circuit 28 during each horizontal line scan period, as shown in FIG. 7G. CRT drive circuit 28 then suitably compensates this signal, as previously noted, and supplies the same to the control grid 30 of the electron gun 32 of cathode ray tube 34 to modulate the electron beam as it scans the color phosphor screens on the front face of cathode ray tube 34.

Figure 3:
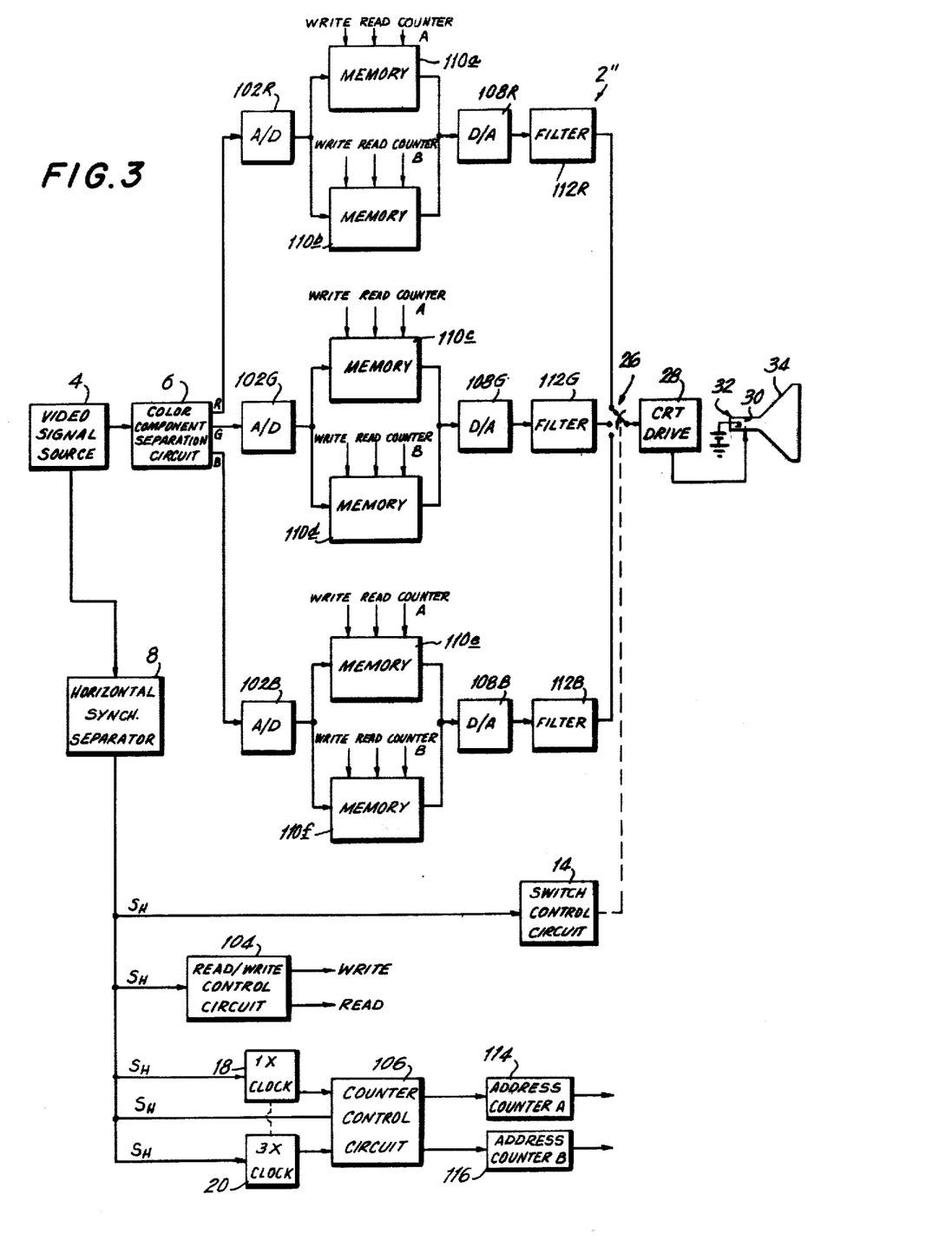
FIG. 3 is a block diagram of still another embodiment of an apparatus for producing a video signal according to this invention.

Referring now to FIG. 3, it is seen that in a still further embodiment of the invention, elements corresponding to those described above with reference to the apparatus of FIG. 1 are identified by the same reference numerals. The apparatus 2'' of FIG. 3 is generally the digital equivalent of the analog arrangement of FIG. 1. Thus, the video signal from video signal source 4 is supplied to color component separation circuit 6 where it is separated into respective red (R), green (G) and blue (B) color components which are then supplied to respective analog-to-digital converters 102R, 102G and 102B. The outputs from the analog-to-digital converters are supplied to respective pairs of digital memory devices 110a, 110b; 110c, 110d; and 110e, 110f; which may be constituted by conventional ROMs. The writing in and reading out of information from memory devices 110a–110f is controlled by READ/WRITE control circuit 104 which may also be conventional and has supplied thereto the horizontal synchronizing signals $S_H$ from horizontal synchronizing signal separator 8. Thus, READ/WRITE control circuit 104 alternately supplies a WRITE or READ signal to the respective memory devices during each horizontal line scan period to enable them to either write in the digitized color component signals or to read these signals out of the respective memory devices. More particularly, and with reference first to memory devices 110a and 110b, when a WRITE signal is supplied to memory device 110a, a READ signal is supplied to memory device 110b and these signals are alternately supplied to the respective memory devices during each horizontal line scan period. Thus, during a horizontal line scan period, while information is being written into memory device 110a, information previously written into memory device 110b is read out therefrom. During the next horizontal line scan period, a WRITE signal is supplied to memory device 110b to permit information to be written into that memory device, while a READ signal is supplied to memory device 110a to permit information to be read out from that memory device, and so on. In other words, READ/WRITE control circuit 104 controls the writing and reading of information into and from memory devices 110a–110f in much the same manner as do switches 12R,12G, 12B, 24R, 24G and 24B in regard to memory devices 10a–10f in the embodiment of FIG. 1.

The rate at which video information is written into and read out of memory devices 110a–110f is determined by a counter control circuit 106. Counter control circuit 106 is controlled by the horizontal sychronizing signals $S_H$ from horizontal synchronizing signal separator 8 to supply clock pulses from clocks 18 and 20 to address counters 114 and 116, which control the rate at which information is written into or read out of the memory devices. Each first memory device 110a, 110c or 110e of each pair of memory devices is controlled by address counter 114 while the remaining memory devices 110b, 110d and 110f are controlled by address counter 116. Thus, for example, when a WRITE signal is supplied to memory device 110a, counter control circuit 106 supplies address counter 114 with clock pulses from clock 18. When memory device 110a is supplied with a READ signal from READ/WRITE control circuit 104, counter control circuit 106 supplies address counter 114 with clock pulses from clock 20. Since clock 20 produces clock pulses having a frequency three times that of clock pulses from clock 18, the information stored in memory device 10a is read out at three times the rate at which it was written into the memory device, and is thereby compressed. In this manner, if an input clock rate of 12 MHz from clock 18 is used to write information into a memory device, an output clock rate of 36 MHz from clock 20 is utilized to read out or sample the information stored in that memory device. It is to be noted that, as with the apparatus of FIG. 1, during the read out operation, the compressed video information is regenerated so as to be read out three times in succession during each horizontal line scan period.

The information read out from the memory devices is supplied to respective digital-to-analog converters 108R, 108G and 108B, and the converted analog signals are then supplied through respective filters 112R, 112G and 112B in which the clock frequency data is filtered from the information signal. The resultant signals produced at the output terminals of filters 112R, 112G and 112B are identical to the signals produced at switches 24R, 24G and 24B in the embodiment of FIG. 1, and as shown in FIGS. 6G, 6H and 6I. The remaining components of the circuit, including switch control circuit 14, output switch 26, CRT drive circuit 28 and cathode ray tube 34, may be identical to those of FIG. 1 and may operate in an identical manner thereto. It is to be noted, however, that the digital memory devices of FIG. 3 provide a more efficient operation than the analog devices of FIG. 1. For example, unlike the CCD devices of FIG. 1, the digital memory devices of FIG. 3 can be reset to their zero positions at any time. Thus, if for some reason, the color component signals fall out of synchronization, the digital memory devices of FIG. 3 can be reset to their zero positions, so that, at most, only one horizontal line of information will be lost. Further, the digital circuitry of FIG. 3 is adapted to operate at a much faster speed than the analog circuitry of FIG. 1.

Figure 4:
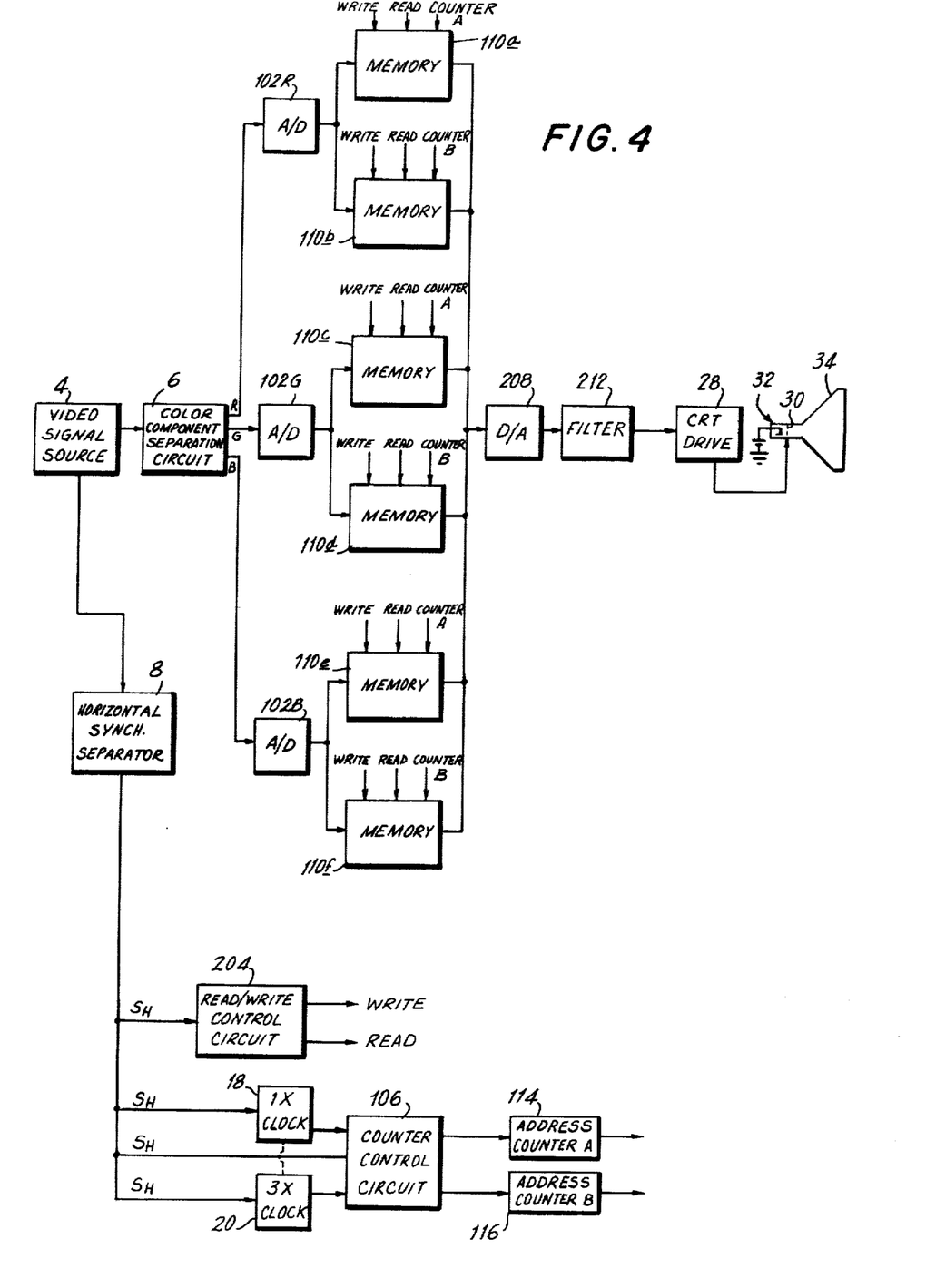
FIG. 4 is a block diagram showing a modification of the embodiment of FIG. 3.

The embodiment of FIG. 3 may be modified as shown in FIG. 4 in which only one digital-to-analog converter 208 and one filter 212 are required and switch 26 is eliminated. Such simplification can be accomplished by supplying all of the outputs from memory devices 110a–110f to the single digital-to-analog converter 208 in which the sequential reading out of the information signals is controlled by a READ/WRITE control circuit 204. In such an arrangement, when information is being written into memory devices 110a, 110c and 110e, READ signals would be sequentially supplied from circuit 204 to memory devices 110b, 110d and 110f during successive thirds of each horizontal line scan period to produce a repetitive RGB signal during each horizontal line scan period, as shown in FIG. 6J. In such a case, digital-to-analog converter 208 supplies a corresponding analog signal to filter 212 which then directly supplies the RGB signal to CRT drive circuit 28.

Figure 5:
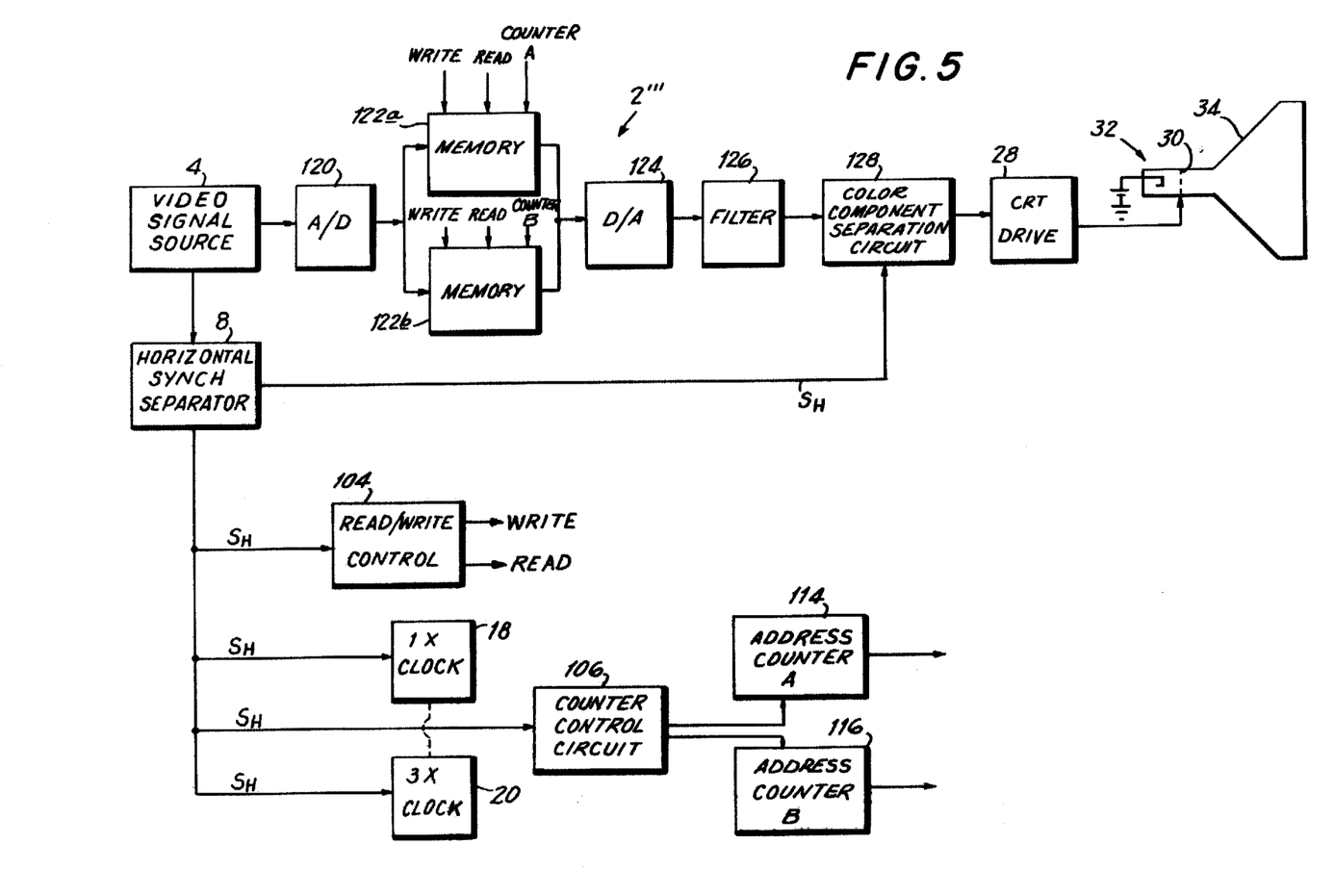
FIG. 5 is a block diagram of yet another embodiment of an apparatus for producing a video signal according to this invention.

Referring now to FIG. 5, another embodiment of the present invention is shown, in which elements corresponding to those described above with reference to the apparatus of FIG. 3 are identified by the same reference numerals. The apparatus 2''' of FIG. 5 is the digital equivalent circuit of the analog circuit of FIG. 2. Thus, the entire video signal from video signal source 4 is supplied to an analog-to-digital converter 120 which converts the signal to digital form and supplies the digitized video signal to digital memory devices 122a and 122b. In a manner identical to that of FIG. 3, the writing of information into, and the reading of information from memory devices 122a and 122b is controlled by WRITE and READ signals from READ/WRITE control circuit 104, and the rate at which the video information is written into, and read out of the memory devices is controlled by clocks 18 and 20, counter control circuit 106 and address counters 114 and 116. Thus, the video information that is read out from memory devices 122a and 122b forms successive horizontal line intervals of video signal information in digital form, with each line interval being comprised of three successive and identical video signals in compressed form, as shown in FIG. 7C. This signal is then supplied to a digital-to-analog converter 124 which converts the signal back to analog form and a filter circuit 126 which filters out the clock pulses from the successive video signals. Filter circuit 126 then supplies the video signal to a color component separation circuit 128 which derives the respective red (R), green (G) and blue (B) color components from the video signal. It is to be noted that switch 26 of FIG. 3 is incorporated into color component separation circuit 128, which has supplied thereto the horizontal synchronizing signals $S_H$ so that this circuit provides successive horizontal line intervals of the red, green and blue color components of the video signal, as shown in FIG. 7G. This signal is then fed to CRT drive circuit 28 which supplies a suitably compensated video signal to control grid 30 of electron gun 32 of cathode ray tube 34.

It will be readily seen that the above described embodiments of this invention provide distinct advantages over the prior art system which have been earlier discussed. For example, because of the single tube design characteristic of this invention, an apparatus embodying the same can be made on an extremely small scale. For example, it may be possible to construct such an apparatus with the dimensions of a large stereo receiver, and which can be used like a slide projector. In such case, a simple screen could be placed against the wall or hinged on the device and, through suitable lenses, the image could easily be projected on the screen. In addition, since only one cathode ray tube with only one electron gun is utilized, the power requirements of this system are greatly reduced in comparison to those of a three gun system. Moreover, because of the construction of the cathode ray tube, no shadow mask or aperture grill is required. It should also be realized that the present system is readily usable with a standard NTSC signal as transmitted.

It should be noted that, although a line sequential system has been shown and described herein, the present invention could very well be applied to a frame sequential system. For example, with reference to FIG. 2, entire frames of video information could alternately be stored in memory devices 44a and 44b. In that case, while one frame of video information is being written into memory device 44a, the preceding frame can be read out of memory device 44b three times in succession during a standard frame scan. Color component separation circuit 6' would then separate each of the components in much the same way as in the line sequential arrangement. Switch 26 would then supply only the red color component to CRT drive circuit 28 during the first third of the frame period while the electron beam is made to scan only the red phosphor screen 36R. During the next third of a frame period, the green signal would be supplied to CRT drive circuit 20 to modulate the electron beam as it is made to scan only the green phosphor screen 36G and, during the last third the blue signal would modulate the electron beam which is then made to scan the blue phosphor screen 36B. Since an entire vertical scan normally occurs in one-sixtieth of a second, the electron beam would first scan the red phosphor screen in one one-hundred and eightieth (1/180) of a second, next the green phosphor screen 36G in the same time and lastly, the blue phosphor screen 36B in the same time. This last described system would obviously require special electron beam deflection apparatus so that the electron beam first scans the entire red phosphor screen, then the green phosphor screen, and finally, the blue phosphor screen. Further, although the present invention has been described in relation to three images in the red, green and blue primary colors, it should be evident that the invention is not limited to the utilization of three colors or to the specific colors utilized.

Having described specific preferred embodiments of the invention with reference to the accompanying drawings, it is to be understood that the invention is not limited to those precise embodiments and that various changes and modifications may be effected therein by one skilled in the art without departing from the scope or spirit of the invention as defined in the appended claims.

What is claimed is:

1. Apparatus for producing a video signal having at least two color components, comprising:
   a source of said video signal;
   storing means for simultaneously storing said at least two color components at a first rate; and
   reading means for sequentially reading out said at least two color components from said storing means at a second rate which is sufficiently faster than said first rate so that said at least two color components are sequentially read out in a time not greater than the time required for simultaneously storing each of said at least two color components.

2. Apparatus according to claim 1; in which said storing means includes a plurality of memory means each adapted to store a respective one of said at least two color components.

3. Apparatus according to claim 2; in which said plurality of memory means includes a plurality of analog charge-coupled devices.

4. Apparatus according to claim 2; in which said plurality of memory means includes a plurality of digital memory devices.

5. Apparatus for producing a video signal having at least two color components, comprising:
   a source of said video signal;
   storing means for simultaneously storing said at least two color components at a first rate, said storing means including a plurality of memory means each adapted to store a respective one of said at least two color components, said plurality of memory means including a pair of first and second memory means for each of said color components, and in which each of said color components is alternately supplied to said first and second memory means of the respective pair thereof; and
   reading means for sequentially reading out said at least two color components from said storing means at a second rate which is sufficiently faster than said first rate so that said at least two color components are sequentially read out in a time not greater than the time required for simultaneously storing each of said at least two color components.

6. Apparatus according to claim 5; in which each of said color components is alternately supplied to said first and second memory means of said respective pair during successive horizontal line scan periods.

7. Apparatus according to claim 6; in which said at least two color components include red, green and blue color components, and said plurality of memory means includes six memory means with two of said memory means being provided for each of said red, green and blue color components.

8. Apparatus according to claim 5; in which each said color component is alternately supplied to said first and second memory means of said respective pair during successive frame periods.

9. Apparatus according to claim 5; in which said storing means further includes first switch means for alternately supplying each of said color components to said first and second memory means of said pair.

10. Apparatus according to claim 9; in which each of said memory means includes a digital memory device and said first switch means includes a WRITE control means for supplying WRITE pulses to the respective memory devices to write in at least said color components into said respective memory devices.

11. Apparatus according to claim 9; in which said reading means includes second switch means for sequentially reading out said at least two color components alternately from said first and second memory means of said respective pair at said second rate.

12. Apparatus according to claim 11; in which said second switch means includes READ control means for supplying READ pulses to the respective memory devices to read out said color components from said respective memory devices.

13. Apparatus according to claim 11; in which one of said first and second memory means of each said pair coacts with said first switch means only when the other of said first and second memory means of the respective pair coacts with said second switch means.

14. Apparatus according to claim 11; in which said storing means includes a first clock for controlling said first rate at which said at least two color components are stored in said respective memory means.

15. Apparatus according to claim 14; in which said storing means further includes a second clock for controlling said second rate at which said color components are read out from said memory means.

16. Apparatus according to claim 15; in which said video signal includes horizontal synchronizing signals, and further comprising means to separate said horizontal synchronizing signals for controlling the operation of said first and second clocks.

17. Apparatus according to claim 15; further comprising additional switch means by which said first and second clocks alternately supply first and second clock pulses to each said memory means for controlling the rate at which said at least two color components are stored in and read out of said memory means.

18. Apparatus according to claim 17; in which said first and second clock pulses are alternately supplied through said additional switch means to each said memory means during successive horizontal line scan periods.

19. Apparatus according to claim 17; in which said first and second clock pulses are alternately supplied through said additional switch means to each said memory means during successive frame periods.

20. Apparatus according to claim 2; in which said plurality of memory means includes first and second memory means, and said video signal is alternately supplied to said first and second memory means.

21. Apparatus according to claim 20; in which said video signal is alternately supplied to said first and second memory means during successive horizontal line scan periods.

22. Apparatus according to claim 20; in which said video signal is alternately supplied to said first and second memory means during successive frame periods.

23. Apparatus for producing a video signal having at least two color components, comprising:
a source of said video signal;
storing means for simultaneously storing said at least two color components at a first rate, said storing means including a plurality of memory means each adapted to store a respective one of said at least two color components, with said plurality of memory means including first and second memory means, and said video signal being alternately supplied to said first and second memory means, and said storing means further includes first switch means for alternately supplying said video signal to said first and second memory means; and
reading means for sequentially reading out said at least two color components from said storing means at a second rate which is sufficiently faster than said first rate so that said at least two color components are sequentially read out in a time not greater than the time required for simultaneously storing each of said at least two color components.

24. Apparatus according to claim 23; in which said first and second memory means include respective first and second digital memory devices, and said first switch means includes WRITE control means for supplying WRITE pulses to said first and second memory devices to write said video signal thereinto.

25. Apparatus according to claim 23; in which said reading means includes second switch means for sequentially reading out said video signal alternately from said first and second memory devices.

26. Apparatus according to claim 25; in which said second switch means includes READ control means for supplying READ pulses to said first and second memory devices to read out said video signal therefrom.

27. Apparatus according to claim 25; in which one of said first and second memory means coacts with said first switch means only when the other of said first and second memory means coacts with said second switch means.

28. A video projecting apparatus for projecting a compound image onto a projection screen, comprising:
p1 a cathode ray tube including a face plate with a plurality of color phosphor screens sequentially arranged thereon, and an electron gun for generating an electron beam to sequentially scan said phosphor screens as the beam is modulated by respective color components of a video signal;
a source of said video signal;
storing means for simultaneously storing said color components at a first rate; and
reading means for sequentially transmitting said color components from said storing means to said cathode ray tube for modulating said electron beam as said beam scans the respective color phosphor screens, said color components being sequentially transmitted in a time not greater than the time within which said color components are simultaneously stored.

29. Apparatus according to claim 28; in which said plurality of phosphor screens is comprised of red, green and blue phosphor screens sequentially arranged on said front face plate in a horizontal line scanning direction.

30. Apparatus according to claim 29; further including a plurality of lenses respectively associated with said phosphor screens for projecting images formed on the respective phosphor screens onto a projection screen.

31. Apparatus according to claim 28; in which said storing means includes a plurality of memory means each adapted to store a respective one of said color components.

32. A video projecting apparatus for projecting a compound image onto a projection screen, comprising:

a cathode ray tube including a face plate with a plurality of color phosphor screens sequentially arranged thereon, and an electron gun for generating an electron beam to sequentially scan said phosphor screens as the beam is modulated by respective color components of a video signal;

a source of said video signal;

storing means for simultaneously storing said color components at a first rate, said storing means including a plurality of memory means each adapted to store a respective one of said color components, and in which said plurality of memory means includes a pair of first and second memory means for each of said color components, and in which each color component is alternately supplied to said first and second memory means of the respective pair thereof during successive horizontal line scan periods; and reading means for sequentially transmitting said color components from said storing means to said cathode ray tube for modulating said electron beam as said beam scans the respective color phosphor screens, said color components being sequentially transmitted in a time not greater than the time within which said color components are simultaneously stored.

33. Apparatus according to claim 32; in which said storing means further includes first switch means for said alternate supplying of each color component to said memory means of said respective pair.

34. Apparatus according to claim 33; in which said reading means includes second switch means for sequentially reading out said color components alternately from said first and second memory means of said respective pair thereof at a second rate which is substantially faster than said first rate.

35. Apparatus according to claim 34; in which one of said first and second memory means of each pair coacts with said first switch means only when the other of said first and second memory means of the respective pair coacts with said second switch means.

36. Apparatus according to claim 34; further comprising a first clock controlling said first rate at which said color components are stored in said respective memory means.

37. Apparatus according to claim 36; further comprising a second clock controlling said second rate at which said color components are read out from said memory means.

38. Apparatus according to claim 37; in which said first and second clocks alternately supply first and second clock pulses to each of said memory means for controlling the rates at which two color components are stored in and read out from said memory means.

39. Apparatus according to claim 38; in which said first and second clock pulses are alternately supplied to each of said pair of said respective memory means during successive horizontal line scan periods.

* * * * *